United States Patent
Escure et al.

(10) Patent No.: US 9,849,970 B2
(45) Date of Patent: Dec. 26, 2017

(54) TURBO ENGINE WITH PROPELLER(S) FOR AN AIRCRAFT WITH A SYSTEM FOR CHANGING THE PITCH OF THE PROPELLER

(71) Applicants: SNECMA, Paris (FR); GE Aviation Systems Limited, Gloucestershire (GB)

(72) Inventors: Didier Rene Andre Escure, Nandy (FR); Denis Louis Bocquet, Bois le Roi (FR); Gilles Alain Charier, La Grande Paroisse (FR); Aleksander Szymandera, Warsaw (PL); Marek Malitka, Warsaw (PL); Jan Sikorski, Warsaw (PL); Christopher Carrington, Gloucester (GB)

(73) Assignees: SNECMA, Paris (FR); GE Aviation Systems Limited, Gloucestershire (GB)

( * ) Notice: Subject to any disclaimer, the term of this patent is extended or adjusted under 35 U.S.C. 154(b) by 590 days.

(21) Appl. No.: 14/349,271

(22) PCT Filed: Oct. 3, 2012

(86) PCT No.: PCT/FR2012/052241
§ 371 (c)(1),
(2) Date: Apr. 2, 2014

(87) PCT Pub. No.: WO2013/050704
PCT Pub. Date: Apr. 11, 2013

(65) Prior Publication Data
US 2014/0294585 A1    Oct. 2, 2014

(30) Foreign Application Priority Data
Oct. 3, 2011 (FR) ...................................... 11 58891

(51) Int. Cl.
*B64C 11/32* (2006.01)
*B64C 11/30* (2006.01)
(Continued)

(52) U.S. Cl.
CPC ............ *B64C 11/30* (2013.01); *B64C 11/385* (2013.01); *F02C 3/067* (2013.01); *F02K 3/072* (2013.01);
(Continued)

(58) Field of Classification Search
CPC ..... B64C 11/385; B64C 11/30; B64C 11/306; B64D 2027/005; Y02T 50/66;
(Continued)

(56) References Cited

U.S. PATENT DOCUMENTS 2,360,791 A * 10/1944 Putnam ................. F03D 7/0224
290/44
3,869,221 A * 3/1975 Wildner .................... F01D 7/00
415/130
(Continued)

FOREIGN PATENT DOCUMENTS

| EP | 1 921 325 | 5/2008 |
| FR | 2 551 023 | 3/1985 |

(Continued)

OTHER PUBLICATIONS

International Search Report dated Feb. 14, 2013 in PCT/FR12/052241 Filed Oct. 3, 2012.

*Primary Examiner* — Craig J Price
(74) *Attorney, Agent, or Firm* — Oblon, McClelland, Maier & Neustadt, L.L.P.

(57) ABSTRACT

A turbo engine includes a system for changing a pitch of blades of a propeller, the system including an annular fluid cylinder with a linear drive and a link mechanism linking the cylinder to the blades of the propeller to change an orien- (Continued)

tation of the propeller. The annular cylinder of the system can be rigidly mounted on a fixed housing supporting the propeller and internal to the propeller, unlike the blades mounted in an external rotating hub of the propeller, and the link mechanism includes a displacement transfer bearing fixed, on one side, to the mobile part of the cylinder and cooperating, on the other side, with a mechanism linking to the blades of the rotating hub of the propeller.

7 Claims, 2 Drawing Sheets

(51) Int. Cl.
| | | |
|---|---|---|
| *B64C 11/38* | (2006.01) | |
| *F02K 3/072* | (2006.01) | |
| *F02C 3/067* | (2006.01) | |
| *B64D 27/00* | (2006.01) | |
| *F01D 1/26* | (2006.01) | |

(52) U.S. Cl.
CPC .......... *B64D 2027/005* (2013.01); *F01D 1/26* (2013.01); *F05D 2260/70* (2013.01); *Y02T 50/66* (2013.01); *Y02T 50/671* (2013.01)

(58) Field of Classification Search
CPC ... Y02T 50/671; F02K 3/072; F05D 2260/70; F01D 1/26; F02C 3/067
USPC .......................... 416/120, 124, 128, 129, 147
See application file for complete search history.

(56) References Cited

U.S. PATENT DOCUMENTS

| | | | | |
|---|---|---|---|---|
| 3,873,236 A | * | 3/1975 | Gall | .......... F01D 7/00 416/156 |
| 3,922,852 A | * | 12/1975 | Drabek | .......... F01D 7/00 415/130 |
| 3,964,839 A | * | 6/1976 | Kusiak | .......... F01D 7/00 416/155 |
| 4,329,117 A | * | 5/1982 | Doman | .......... F03D 15/00 416/170 R |
| 4,657,484 A | * | 4/1987 | Wakeman | .......... B64C 11/306 415/130 |
| 4,738,591 A | * | 4/1988 | Butler | .......... B64C 11/32 416/129 |
| 5,152,668 A | * | 10/1992 | Bulman | .......... B64C 11/32 416/129 |
| 5,154,580 A | * | 10/1992 | Hora | .......... B64C 11/306 416/129 |
| 5,431,539 A | * | 7/1995 | Carvalho | .......... B64C 11/32 416/157 R |
| 9,616,992 B2 | * | 4/2017 | Belmonte | .......... B64C 11/38 |
| 2009/0311100 A1 | | 12/2009 | Gallet | |
| 2012/0070290 A1 | | 3/2012 | Balk et al. | |
| 2012/0070292 A1 | * | 3/2012 | Balk | .......... B64C 11/306 416/168 A |
| 2012/0079809 A1 | * | 4/2012 | Glynn | .......... B64C 11/38 60/268 |
| 2012/0093652 A1 | | 4/2012 | Belmonte et al. | |
| 2012/0099987 A1 | * | 4/2012 | Belmonte | .......... B64C 11/32 416/34 |
| 2013/0011529 A1 | * | 1/2013 | Belzowski | .......... A21D 13/0006 426/231 |
| 2014/0017086 A1 | * | 1/2014 | Charier | .......... B64C 11/308 416/128 |
| 2014/0294585 A1 | * | 10/2014 | Escure | .......... B64C 11/385 416/147 |
| 2016/0333709 A1 | * | 11/2016 | Belmonte | .......... F02K 3/072 |
| 2016/0368592 A1 | * | 12/2016 | Szymandera | .......... B64C 11/308 |
| 2017/0066524 A1 | * | 3/2017 | Miskiewicz | .......... B64C 11/40 |
| 2017/0066525 A1 | * | 3/2017 | Tomaszewicz | .......... F02C 6/206 |

FOREIGN PATENT DOCUMENTS

| | | |
|---|---|---|
| WO | 2010 130893 | 11/2010 |
| WO | 2010 136686 | 12/2010 |

* cited by examiner

TURBO ENGINE WITH PROPELLER(S) FOR AN AIRCRAFT WITH A SYSTEM FOR CHANGING THE PITCH OF THE PROPELLER

BACKGROUND OF THE INVENTION

Field of the Invention

The present invention relates to a turbine engine with propeller(s) for an aircraft with a system for changing the pitch of the propeller.

More specifically, but not exclusively, the turbine engine is a turboshaft engine provided with contra-rotating propellers, and referred to as "open rotor" or "unducted fan", but can also be, without departing from the scope of the invention, a turboprop engine with one propeller or a plurality of pusher propellers, with the system for changing the pitch of the vanes equally adapting to the one propeller or to each propeller of the turbine engine.

Description of the Related Art

A turbine engine of the open rotor type mainly comprises, inside a fixed cylindrical nacelle supported by the structure of the aircraft (such as the rear part of the fuselage of an aeroplane), a "gas generator" part and, aligned behind or in front of said part, a "propulsion" part. This propulsion part comprises two coaxial and contra-rotating propellers, upstream (front) and downstream (rear), respectively, that are driven, into reverse rotation relative to one another, by an epicycloidal reducer driven by a low-pressure turbine of the gas generator part, and for which the vanes of the propellers extend in a substantially radial manner outside of the nacelle.

Each propeller conventionally comprises a hub with an outer polygonal ring, rotationally received in the fixed nacelle and having radial cylindrical compartments distributed on its periphery about the longitudinal axis of the turboshaft engine. The roots of the vanes are received in the compartments of each ring.

In order to allow the optimal operation of the turboshaft engine in the various flight phases that are encountered, the vanes of the contra-rotating propellers can turn in the radial compartments of the rings. To this end, they are driven in rotation about their respective pivot axes by a suitable system allowing the setting angle of the vanes to be varied in flight, i.e. the pitch of the propellers.

This system for changing the pitch of the vanes of the propellers covers an angular range of rotation between two end positions, namely an end position referred to as a "reverse" position, in which the vanes exceed, for example, the plane transverse to the axis of the turbine engine (the direction of forward movement of the aeroplane) by 30° so as to assist with the braking of the aircraft, in the same way as conventional thrust reversers, and an end position referred to as "feathering", in which the vanes are then feathered as much as possible relative to the direction of forward movement of the aeroplane, for example, in the event of engine failure, and thus provide the least possible resistance (drag). The angular stroke of the vanes between the feather and reverse positions is, for example, approximately 120°.

Different solutions have been proposed for changing the pitch of the vanes of propellers on "open rotor" or other types of turboshaft engines.

For example, a turboshaft engine is known from the document FR 2 908 451 in which the system for changing the orientation of the vanes of each propeller advantageously comprises a single annular actuator mounted by its cylinder on the ring hub of the propeller, whereas its piston is linked, via a linking mechanism of the system associated with the actuator, to the roots of the various vanes. The displacement of the piston following the fluidic control of the annular actuator provides the required angular pivoting of the vanes by the linking mechanism by varying their pitch.

Even though this provides satisfactory results, such a solution involves an annular actuator and thus a cylinder, which is a fixed part, and a piston rod, which is a movable part, with a large diameter since it is assembled on the same hub as the propeller, as well as a mass that is necessarily high due to its large diameter, especially since it then has to be reinforced in order to withstand the centrifugal forces and to avoid the risks of ovalisation caused by the rotation of the associated propeller.

Furthermore, deformations and sealing problems tend to appear due to the rotating mounting of the annular actuator on the hub of the propeller and the fluidic elements used (rotating seals, etc.) in this extreme environment (significant mechanical and thermal stresses, high rotation speed, etc.). Finally, the linking mechanism of the system, which is composed of ball joints on the roots of the vanes and receptacles sliding in an annular groove of the piston, leads to wear phenomena that must be monitored during use in order to prevent the risk of jamming.

A mechanism for changing the pitch of an aeroplane propeller assembly is also known from the document FR2551023.

BRIEF SUMMARY OF THE INVENTION

The object of the present invention is to overcome these disadvantages and relates to a turbine engine with propeller(s) for an aircraft, with the design of the system for changing the pitch of the vanes of the propeller limiting the problems that are particularly associated with sealing and spatial requirements, whilst guaranteeing operational reliability during use.

To this end, the turbine engine with at least one propeller for an aircraft, of the type including a system for changing the pitch of the vanes of said propeller comprising an annular fluid actuator with linear control and a linking mechanism linking the actuator to the vanes of the propeller in order to change their orientation, is noteworthy, according to the invention, in that:
  said annular actuator of the system is mounted in a connected manner on a fixed housing supporting said propeller and inside said propeller opposed to the vanes mounted in an outer rotary hub of the propeller;
  said linking mechanism linking the movable part of said annular actuator to the vanes of the rotary hub of said propeller comprises an intermediate transfer bearing fixed, on one side, to the movable part of the actuator and cooperating, on the other side, with means for linking the mechanism to the vanes of the rotary hub in such a way that the transfer bearing of the mechanism driven in rotation transfers the translational displacement of the movable part of the fixed actuator to the means for linking the rotatory mechanism in order to change the orientation of the vanes of the propeller;
  said linking means comprise a set of connecting rods or similar elements distributed around the annular actuator and linked, on one side, to the transfer bearing and, on the other side, to radial rotary shafts which are respectively integral with the roots of the vanes of said propeller so as to drive, following the translational displacement of the connecting rods of the linking mechanism, the rotation of the radial shafts and the associated vanes; and said connecting rods are articulated to a ring of the linking means, rotationally linked to the rotary cylindrical wall of the propeller and axially free therefrom.

Thus, by virtue of the invention, due to its arrangement on a fixed housing or internal stator relative to the hub of the propeller, the size of the annular actuator of the orientation system is significantly reduced and, as a result, its mass is reduced. In this way, in addition to a reduction in the mass of the turbine engine, the actuator is less sensitive to the centrifugal forces of the turbine engine and, therefore, to dimensional variations, without requiring the reinforcements initially necessary in the prior art. Furthermore, as it is fixed, integral the stator, it is easier to seal, thus drastically reducing the risks of leaks both due to the omission of fluidic elements and the hydraulic transfer bearing present when it is linked to the rotary hub or the rotor of the propeller.

Consequently, the system provides a simplified embodiment with a single actuator and a fully mechanical bearing and linking means mechanism, allowing the translational movement of the cylinder to be "changed" into a rotation of the vanes with high operational reliability (practically zero risk of leaks since the cylinder is fixed) and with a controlled mass, whilst overcoming the disadvantages of the prior solutions using large and heavy annular actuators, directly integral with the hub of the propeller with detrimental centrifugal forces. Furthermore, an embodiment of the linking means with connecting rods ensures safety and operating reliability during use without sliding and/or friction of parts relative to one another, as is the case in the prior art.

Preferably, the intermediate transfer bearing of the linking mechanism is a ball bearing or similar bearing, the inner ring of which is axially mounted in a connected manner on the movable part of the annular actuator, whereas the outer ring cooperates with the linking means of the mechanism rotationally linked to a rotary cylindrical wall which is integral with the propeller and translationally free along this wall, so as to follow the displacement of the actuator. The manufacturing simplicity of the bearing is noteworthy, guaranteeing optimal operating reliability. In order for forces to pass without play between the actuator and the vanes of the propeller, a transfer bearing with two rows of balls or similar elements can be used.

More particularly, said connecting rods are articulated, on the one hand, to the ring of the linking means and, on the other hand, to transverse journals provided on the rotary shafts of the vanes. In this way, the pivoting of the shafts of the vanes is carried out by a mechanism of the connecting rod/journal type guaranteeing operational simplicity and reliability.

Advantageously, the link between the ring of the linking means of the mechanism, in which the transfer bearing is housed, and the rotary cylindrical wall of the propeller, is of the type with splines or similar elements parallel to the axis of the propeller. In this way, such a link is particularly reliable for translationally guiding the linking mechanism by the displacement imposed by the actuator, whilst being able to turn with the propeller via the rotary cylindrical wall which is integral with the propeller, so as to modify the orientation of the vanes by said linking means.

In order to reduce the spatial requirements of the system in the turbine engine as much as possible, the annular control actuator is arranged substantially in line with the hub of the propeller, which particularly reduces the lengths of the connecting rods. Furthermore, in order to prevent the rotation of the movable part, linked to the transfer bearing, relative to the fixed part of the actuator, the movable and fixed parts of the annular actuator are rotationally blocked relative to one another by means of at least one axial rod that passes through the two parts parallel to said actuator.

BRIEF DESCRIPTION OF THE SEVERAL VIEWS OF THE DRAWINGS

The figures in the appended drawings will give a good understanding of how the invention can be produced.

DETAILED DESCRIPTION OF THE INVENTION

Figure 1:
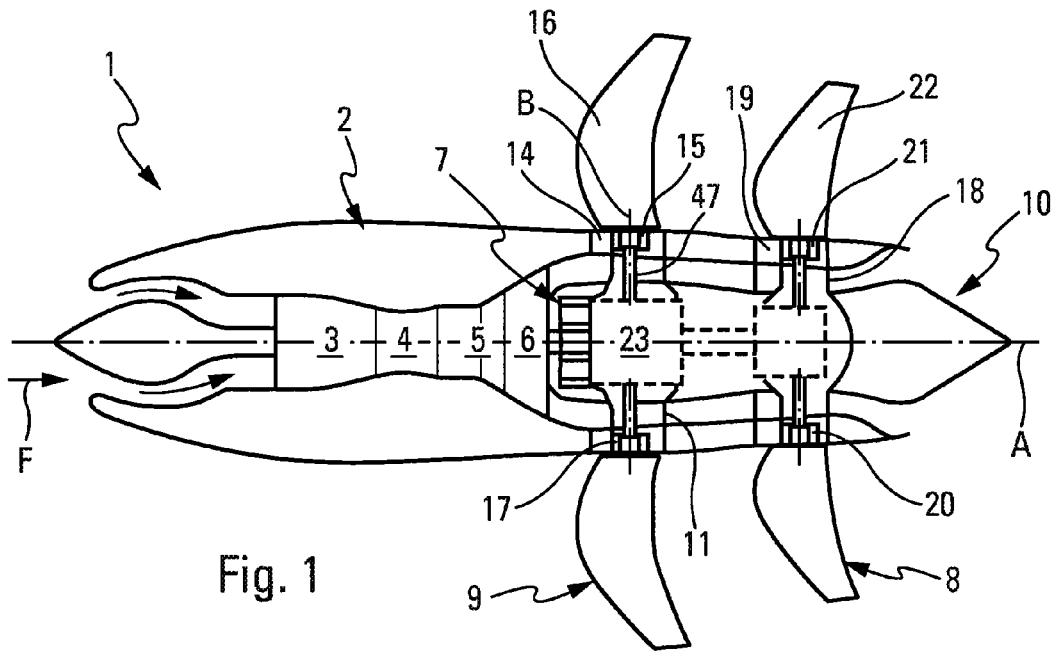
FIG. 1 is a schematic axial sectional view of an unducted fan turboshaft engine positioned downstream of the gas generator, incorporating a system for changing the pitch of the vanes, according to the invention, for one of the propellers of the fan.

Firstly, reference will be made to FIG. 1, which schematically shows a turbine engine such as an unducted fan turboshaft engine 1, referred to as "open rotor" or "unducted fan". This turboshaft engine conventionally comprises, from upstream to downstream in the direction of flow of the gas stream F inside a nacelle 2 of the turboshaft engine, one or two compressors 3 according to the architecture of the single or two-stage gas generator, an annular combustion chamber 4, a high-pressure turbine or two turbines 5, one high-pressure and one intermediate pressure, according to said architecture, and a free low-pressure turbine 6 that drives, by means of a reducer or epicycloidal gearbox 7, and in a contra-rotating manner, two propellers 8, 9 coaxially aligned along the longitudinal axis A of the turboshaft engine and forming the fan. An alternative version of the turbine engine, not shown, could result in, without departing from the scope of the invention, the positioning of the propellers 8 and 9 and of the epicycloidal gearbox 7 upstream of the gas generator, with the assembly being linked to the free low-pressure turbine 6 by an inner shaft.

The propellers, namely a downstream propeller 8 and an upstream propeller 9, are disposed in radial parallel planes, perpendicular to the axis A, and turn by means of the low-pressure turbine 6 and the reducer 7 in opposite directions of rotation.

Figure 2:
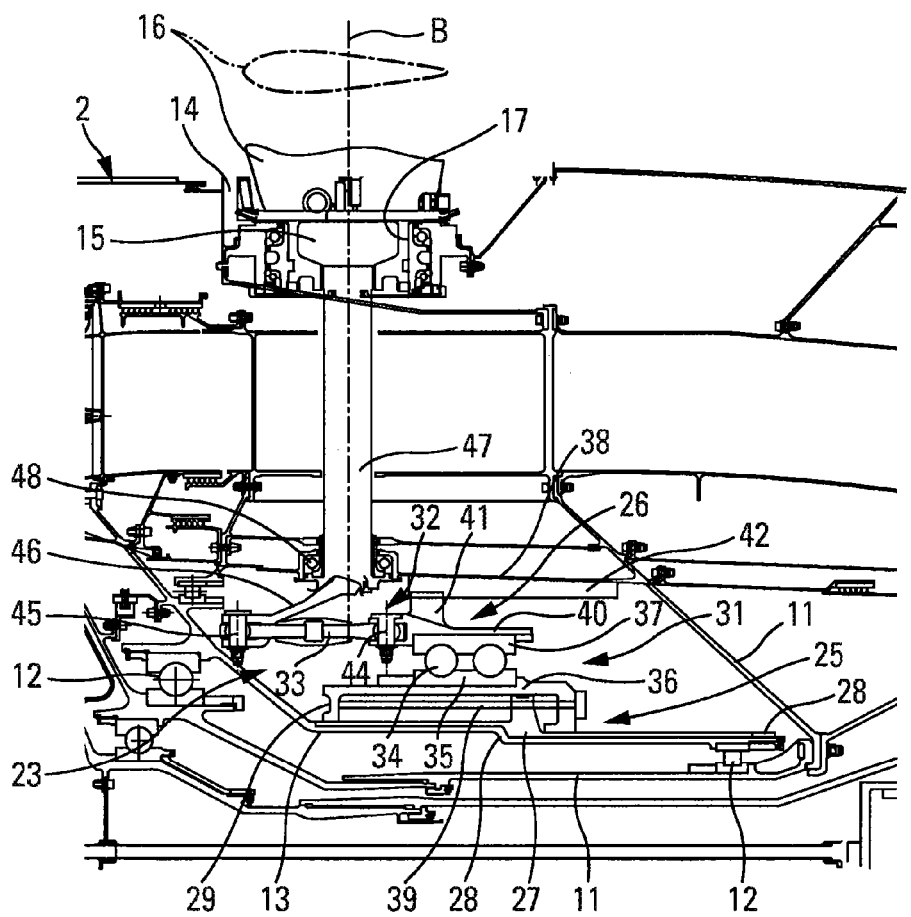
FIG. 2 is an axial half-sectional view of the rear of the turboshaft engine with said system for changing the pitch of the upstream propeller, according to the invention, in an end position, in which the propeller vane that is shown is in the position referred to as a "feather" position.

To this end, as shown in FIGS. 1 and 2, the upstream propeller 9 comprises a rotary cylindrical housing 11 rotationally linked to a corresponding part of the reducer so as to turn in one direction. This rotary housing 11 is supported by ball bearings 12 on a fixed cylindrical housing 13. The housing 11 ends, on the side opposite the reducer 7, with a rotary hub 14 with polygonal ring conventionally housed in the nacelle 2 and receiving, in cylindrical compartments 17, the roots 15 of the vanes 16 of the propeller 9, which vanes thus protrude outside of the nacelle.

Similarly, the downstream propeller 8 comprises a rotary cylindrical housing 18, on one side rotationally linked to another part of the reducer 7, so as to then turn in the opposite direction. This rotary housing 18 in this case is also supported by ball bearings on the fixed cylindrical housing 13 and inside the rotary housing 17. On the other side, the housing 18 is terminated by a rotary hub 19 with a polygonal ring receiving in compartments 20, in the same way as previously, the roots 21 of the vanes 22 of the propeller 8.

During operation, and briefly, the airflow F entering the turboshaft engine 1 is compressed and then mixed with fuel and burnt in the combustion chamber 4. The resulting combustion gases then pass into the turbines 5 and 6 so as to drive by reverse rotation, via the epicycloidal reducer 7, the propellers 8, 9 that provide most of the thrust.

The combustion gases are expelled through a pipe 10 to thereby increase the thrust of the turboshaft engine 1.

Furthermore, the vanes 16 and 22 of the upstream and downstream propellers are of the variable setting angle type, i.e. they can be oriented about their radial pivot axes B by virtue of a system 23 for changing or orienting the pitch of the vanes, so that the vanes assume an optimal angular position according to the operating conditions of the turboshaft engine and the relevant flight phases. In the present description, only the system 23 for orienting vanes associated with the upstream propeller 9 will be described. The downstream propeller 8, which is not shown in FIGS. 2 and 3, can be provided with a system for orienting vanes that is similar or different to that described hereafter with reference to the upstream propeller.

To this end, as shown in FIGS. 1 and 2, the system 23 for changing the pitch of the vanes (and thus their setting angle) is provided inside the turboshaft engine 1, in the internal space positioned between the fixed housing 13 and the rotary housing 11 respectively corresponding to a static or stator part and to a movable or rotor part of the propeller 9, so as to vary the angular position of the vanes and thus the pitch of the propeller.

As shown in FIG. 2, this change system 23 mainly comprises an annular actuator 25 with linear action, along the longitudinal axis A of the turboshaft engine, and a linking mechanism 26 linking the cylinder to the roots 15 of the vanes 16 of the upstream propeller 9.

The annular actuator 25 surrounds the static cylindrical housing 13 by being integral therewith. In particular, the fixed part (or cylinder) 27 of this actuator is held in a suitable position on the static housing 13 by any suitable means, so as to be rotationally and translationally blocked relative to said housing. To this end, stops 28 are provided in the form of a shoulder and a ring. Its movable part (or piston rod) 29 is positioned around the fixed part 27 so as to be able to displace in a linear manner, along the axis A, under the action of the hydraulic control of the actuator 25, not shown.

Therefore, it can be seen that, as the annular actuator 25 is positioned on a part of the fixed housing 13 close to the axis A of the turboshaft engine 1 and inside the rotary hub 14, its spatial requirements and mass are reduced compared with its direct assembly on this hub with a polygonal ring of the rotary housing 11.

In a further configuration, not shown, the actuator can be separated from the housing or fixed support 13, for example, by means of linking flanges or similar elements, and thus form a separate, fixed and possibly one-piece actuator body.

In order to prevent the rotation of the movable part 29 (or piston rod) relative to the fixed part 27 (or cylinder), at least one axial rod 39 is arranged between the two parts 27, 29 passing through them so as to thus rotationally block them relative to one another.

The other part of the system 23, namely the linking mechanism 26 between the actuator and the vanes, comprising a movement transfer bearing 31 and linking means 32 in the form of a set of articulated connecting rods 33 in particular, is mounted around this piston rod 29 outside of the annular actuator 25.

In this embodiment, the bearing 31 is a ball bearing with two rows of balls 34, with its inner ring 35 supported by the movable part 29 of the fixed annular actuator. Stops 36 are also provided on this movable part 29 and are used to limit extreme displacements. The piston rod must be able to be positioned anywhere within its stroke. The outer ring 37 of the ball bearing is turned towards a rotary cylindrical wall 38 of the rotary housing 11 of the propeller. In order to allow the linking mechanism 26 to follow the displacement imposed by the annular actuator 25, whilst turning with the propeller, so as to vary the pitch of the vanes, as will be seen hereafter, a rotational and axially free link along the axis A is provided between the outer ring 37 and the rotary cylindrical wall 38.

To this end, the linking means 32 of the mechanism 26 comprises, between the connecting rods 33 and the transfer bearing 31, a ring 40, which, on the inside, surrounds the outer ring 37 of the bearing and, on the outside, is associated with the inside of the cylindrical wall 38 of the rotary housing 18 by a splined or notched link 41, 42 parallel to the axis A and thus to the propeller. In this way, the splines 41 arranged on the outside of the ring 40 can slide in those 42 of the cylindrical wall through a stroke that allows the vanes to be able to turn between the two previously defined extreme positions. The outer ring 37 of the transfer bearing 31 is, furthermore, axially held in position in the ring 40 and rotationally linked therewith.

The linking means 32 of the mechanism 26 comprise the connecting rods 33, which are evenly distributed around the annular actuator 25 and are designed to act on the roots of the vanes 16 so as to drive them in rotation about their axis B. The number of connecting rods is identical to the number of vanes 16.

In particular, the connecting rods 33 are connected at one of their respective ends to the ring 40 about axes of articulation 44 parallel to the axes B of the vanes. At their other end the connecting rods 33 are linked, by axes of articulation 45 parallel to the preceding axes, to journals 46 provided approximately transversally at the end of the radial rotary shafts 47, the geometric axis of which corresponds to the axis of rotation B of the vanes, orthogonal to the axis A. To this end, opposite the journals 46, the radial shafts 47 are linked to the roots 15 of the respective vanes 16, rotationally mounted in the compartments 17 of the polygonal ring 14. The shafts 47 are also held in a radial position by supports 48 provided on the rotary housing 11 of the upstream propeller 9.

Figure 3:
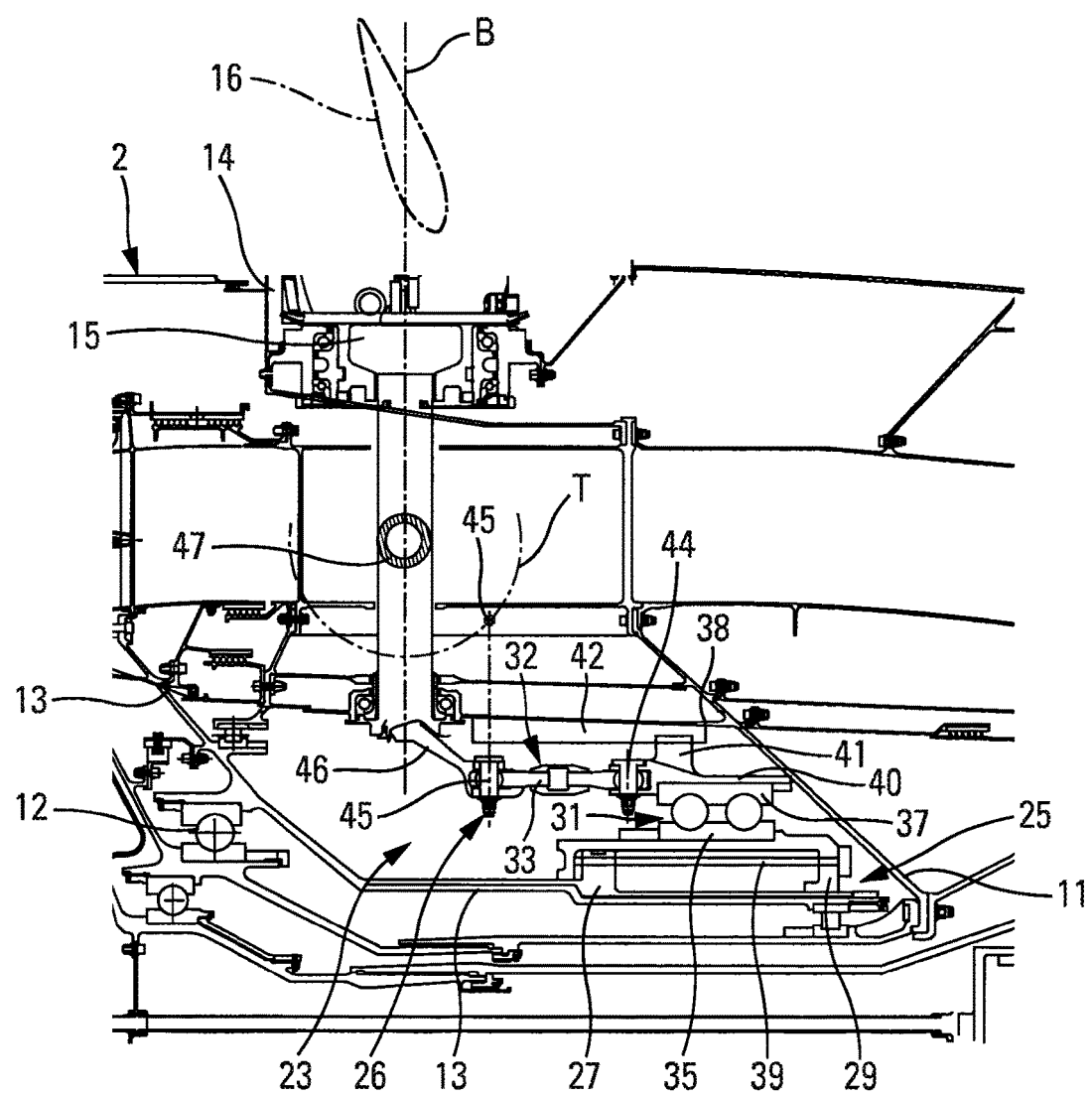
FIG. 3 is an axial half-sectional view of the rear of the turboshaft engine with said system for changing the pitch of the upstream propeller, according to the invention, in the other end position, in which the propeller vane that is shown is in the position referred to as a "reverse" position.

FIGS. 2 and 3 also show the operational kinematics of the system 23 between the two end positions that the vanes 16 of the propellers can occupy, and which are schematically shown as a cross section in these figures. Clearly, any other intermediate position between these two end positions can be assumed by the vanes of the propeller 9.

It is assumed that, when the system 23 is found in the position shown in FIG. 2, in which the annular control actuator 25 is in the retracted position, the vanes 16 of the upstream propeller 9 occupy the feather position, i.e. approximately in the extension of the turboshaft engine so as to offer the least possible resistance (drag). This feather position of the vanes of the propeller is, for example, used in the event of engine failure and FIG. 2 shows the schematic cross section, shown in dot-and-dash lines, of a vane 16 in the feather position.

When a modification to the orientation of the vanes 16 of the upstream propeller 9 is required, the pitch changing system 23 acts and, to this end, the annular actuator 25, which, by its fixed part 27, is integral with the housing 13 forming the stator of the turboshaft engine, is controlled, which drives, by filling the corresponding chamber of the annular actuator 25 with pressurised oil, the translational displacement of the movable part 29 of the actuator along the selected stroke, imposed by the pitch changing system. In the example shown in FIG. 3, the movable part 29 is displaced until it is positioned in the fully extended position, corresponding to the reverse position of the vanes 16, with the rods 39 preventing the rotation between the two parts, whilst allowing the movable part 29 to slide on the fixed part 27.

By means of the axial link of the inner ring 35 with the movable part 29 of the actuator, the transfer bearing 31 follows the imposed translational movement so that the outer rotary ring 37 of the ball bearing, which is axially blocked with the ring 40 of the linking means 32 of the mechanism 26, translationally drives said mechanism relative to the cylindrical wall 38 of the rotary housing 18 by means of the splined or notched link 41, 42. Clearly, by virtue of the presence of the transfer bearing 31 dissociating the actuator 25 from the propeller 9, the linking mechanism 26, by translationally moving via the splined link 41 and 42, turns with the housing 18 of the propeller by this same link 41, 42 and by the radial shafts 47 of the vanes via the connecting rods, whereas the annular actuator 25 is rotationally fixed, thus simplifying, among other things, the hydraulic links. The two rows of balls 34 of the bearing allow the transfer of the forces without play, even if they are significant.

As shown in FIG. 3, by the translational displacement of the link mechanism 26 (bearing 31 and linking means 32) to the right, the connecting rods 33 are drawn by means of ball and socket joints 44 and drive, by opposing ball and socket joints 45, the transverse journals 46 that define lever arms in the same way as a conventional connecting rod/crank link so as to facilitate their rotation. The journals 46 thus pivot about the geometric axis B of the radial shafts 47 with which they are integral, whereas the roots 15 of the vanes 16 turn in their respective compartments 17 of the polygonal ring of the rotary hub 14. Each transverse journal defines a single lever arm (46) with a first end pivotally connected by the pivot link to the second end of one of the connecting rods (33) and a second end connected to an end of the radial rotary shafts such that each transverse journal pivots with one of the radial rotary shafts about an axis of one of the radial rotary shafts, and the first end of the lever arms of the transverse journals is further upstream than the second end of the lever arms of the transverse journals in a first position of the movable part of the annular actuator, and the second end of the lever arms of the transverse journals is further upstream than the first end of the lever arms of the transverse journals in a second position of the movable part of the annular actuator.

It is noteworthy that the ball and socket joints 45 associating the connecting rods 33 with the journals 46 then follow a circular trajectory T, having the axes B of the radial shafts 47 for pivoting the vanes 16 as centre, and with a large lever arm (distance between the axis of the ball and socket joint 45 and the axis B), which consequently allows forces (torques) to be transferred, whilst reducing the forces passing through the connecting rods and the actuator, and allowing the pitch of the propellers to be ultimately changed without problems.

The vanes 16 then simultaneously assume, via the axial displacement of the set of connecting rods driven by the cylinder, the requested position as shown in the schematic cross section and by the dot-and-dash line of one of the vanes in FIG. 3. This end position is the reverse position (FIG. 3), in which the vanes have substantially turned by the expected range, approximately 120°, relative to the feather position (FIG. 2) so as to thus oppose the forward movement of the aeroplane (thrust generated against the aeroplane speed) and assist in the braking of the aeroplane.

Furthermore, as the annular actuator 25 is substantially positioned in line with the vanes of the propeller 9, the length of the connecting rods needed to pivot the vanes is then advantageously reduced, contributing to a system with a reasonable mass.

The invention claimed is:

1. A turbine engine with at least one propeller for an aircraft, comprising:
   a system for changing a pitch of vanes of the propeller, the system comprising
      an annular actuator with linear control connected to a fixed housing supporting the propeller, and
      a linking mechanism linking the annular actuator to the vanes of the propeller to change an orientation of the vanes, the linking mechanism comprising an intermediate transfer bearing fixed, on a first side, to a movable part of the annular actuator and cooperating, on a second side, with linking means able to link the linking mechanism to the vanes of the propeller, so that the intermediate transfer bearing of the linking mechanism driven in rotation transfers translational displacement of the movable part of the annular actuator to the linking means to change the orientation of the vanes of the propeller,
   wherein the fixed housing is inside the propeller and close to a longitudinal axis of the turbine engine, opposed to the vanes mounted in an outer rotary hub of the propeller,
   wherein the linking means comprises a set of connecting rods distributed around the annular actuator and linked, on a first side, to the intermediate transfer bearing and, on a second side, to radial rotary shafts that are respectively integral with roots of the vanes of the propeller to drive, following translational displacement of the connecting rods of the linking mechanism, rotation of the radial rotary shafts and the associated vanes,
   wherein a first end of the connecting rods are articulated to a ring of the linking means which is rotationally linked to a rotary cylindrical wall of the propeller and which is axially free from the rotary cylindrical wall, and a second end of the connecting rods are articulated by pivot links to transverse journals provided on the radial rotary shafts of the vanes, each radial rotary shaft being provided with one single transverse journal,
   wherein each transverse journal defines a single lever arm with a first end pivotally connected by said pivot link to the second end of one of the connecting rods and a second end connected to an end of the radial rotary shafts such that each transverse journal pivots with one of the radial rotary shafts about an axis of the one of the radial rotary shafts, and
   wherein the first end of the lever arms of the transverse journals is further upstream than the second end of the lever arms of the transverse journals in a first position of the movable part of the annular actuator, and the second end of the lever arms of the transverse journals is further upstream than the first end of the lever arms of the transverse journals in a second position of the movable part of the annular actuator.

2. The turbine engine according to claim 1, wherein the intermediate transfer bearing of the linking mechanism includes a ball bearing, an inner ring of which is axially mounted in a connected manner on the movable part of the annular actuator, and an outer ring of which cooperates with the linking means of the linking mechanism rotationally linked to the rotary cylindrical wall which is integral with the propeller and translationally free along the rotary cylindrical wall, to follow displacement of the actuator.

3. The turbine engine according to claim 2, wherein the ball bearing of the intermediate transfer bearing comprises a double row of balls.

4. The turbine engine according to claim 1, wherein a link between the ring of the linking means of the linking mechanism, in which the transfer bearing is housed, and the rotary cylindrical wall of the propeller comprises splines parallel to the axis of the propeller.

5. The turbine engine according to claim 1, wherein the annular actuator is arranged substantially in line with the hub of the propeller.

6. The turbine engine according to claim 1, wherein the respectively movable and fixed parts of the annular actuator are rotationally blocked relative to one another by at least one axial rod that passes through two parts parallel to the annular actuator.

7. The turbine engine according to claim 1, comprising two propellers aligned in a contra-rotating manner, upstream and downstream, respectively, wherein at least the upstream propeller comprises the system for changing the pitch of the vanes.

* * * * *